Figure 1A:
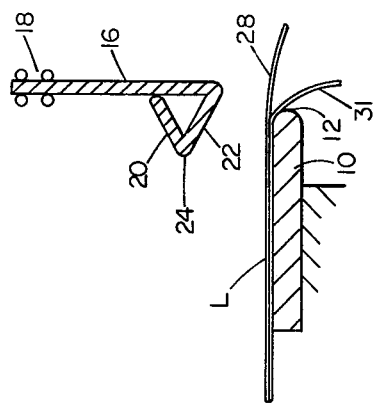
Figure 1B:
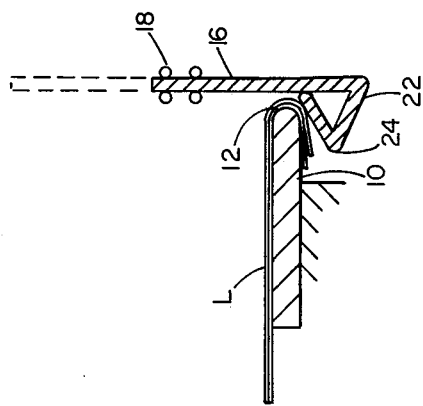
Figure 1C:
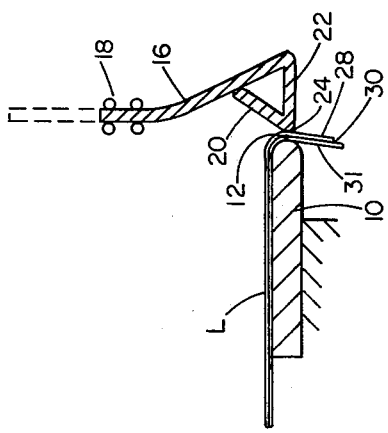
Figure 1D:
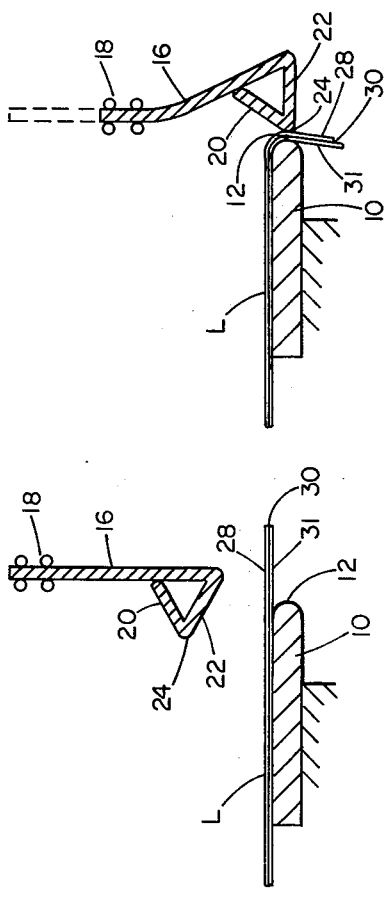

United States Patent [19]

Tobey

[11] 4,173,510
[45] Nov. 6, 1979

[54] APPARATUS FOR SEPARATING LAMINATED LAYERS

[75] Inventor: Frederic S. Tobey, Brewster, Mass.

[73] Assignee: W. H. Brady Co., Milwaukee, Wis.

[21] Appl. No.: 850,266

[22] Filed: Nov. 10, 1977

[51] Int. Cl.² .................. B32B 35/00; B32B 7/12
[52] U.S. Cl. .................................. 156/584; 156/344
[58] Field of Search ............... 156/584, 344, 443; 221/73

[56] References Cited

U.S. PATENT DOCUMENTS

| | | | |
|---|---|---|---|
| 2,422,998 | 6/1947 | Adams et al. | 156/224 |
| 2,754,994 | 7/1956 | Cole | 156/584 X |
| 3,107,814 | 10/1963 | Auger et al. | 221/73 |
| 3,266,797 | 8/1966 | Stievenart | 156/584 X |

Primary Examiner—William A. Powell
Assistant Examiner—Thomas Bokan

[57] ABSTRACT

Laminate layers, such as a label and its liner, are separated by directing both layers at an end of the laminate around a sharp bend to cause shearing and lengthwise offset between the layers, and then releasing the end, the overall orientation being such that, upon release of the end, a differential in the forces that tend to straighten the layers drives apart the shear-weakened adhesive bond.

6 Claims, 12 Drawing Figures

U.S. Patent    Nov. 6, 1979    Sheet 2 of 2    4,173,510
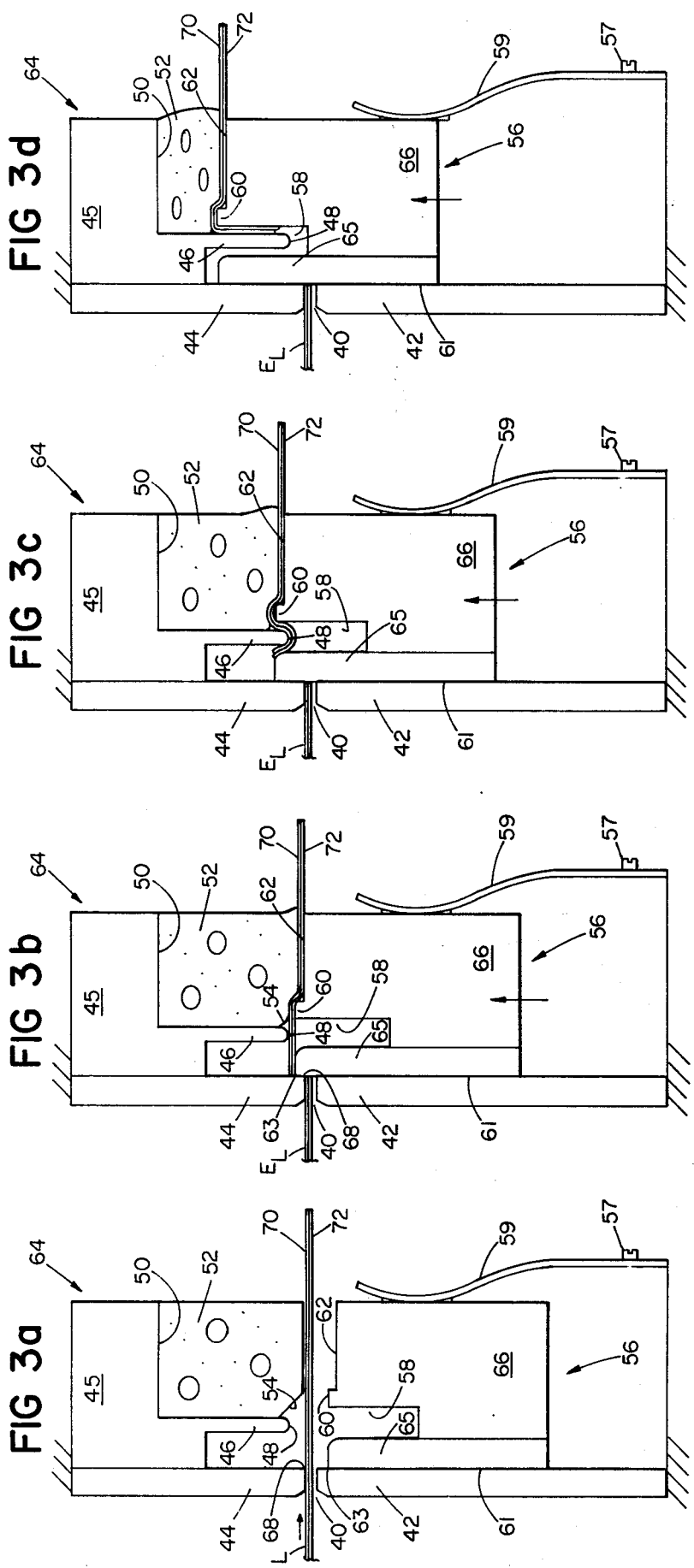
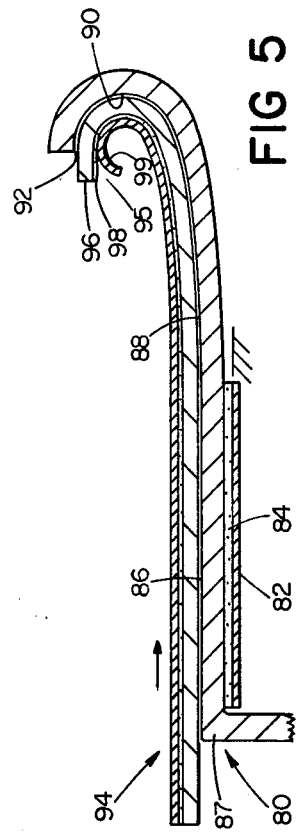
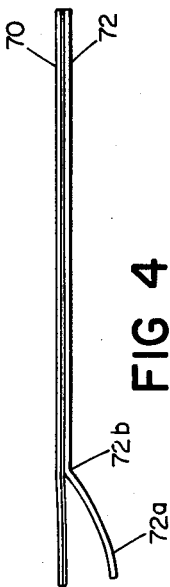

APPARATUS FOR SEPARATING LAMINATED LAYERS

FIELD OF THE INVENTION

This invention relates to separating element layers from other layers to which they are adhered; e.g., to removing labels from liners.

BACKGROUND OF THE INVENTION

It is well known in the art to remove labels adhered with pressure-sensitive adhesive to a continuous liner by directing the liner around a sharp bend so that the stiffness of the label in tending to resist bending imposes forces in tension causing at least partial separation of the label leading edge; e.g., Cole U.S. Pat. No. 2,754,994. Employing this principle necessitates maintaining guide control of a portion of the liner downstream (i.e., in advance) of the leading edge of the label.

SUMMARY OF THE INVENTION

I have discovered that leading edges of discrete elements such as label layers may be removed from liner layers to which they are adhered by directing both layers at an end of an element-liner laminate around a sharp bend to cause shearing and lengthwise offset between the layers, and then releasing the end, the overall orientation being such that, upon release of the end, a differential in the forces that tend to straighten the layers drives apart the shear-weakened adhesive bond. Among other advantages, this eliminates any necessity of guiding (or even maintaining contact with) any liner portion downstream of laminate leading edges.

In a preferred embodiment of the invention, a resilient finger-like member wipes an end of a coterminous label-liner laminate around a sharply rounded plate with the layer of better bend memory on the outside of the bend.

PREFERRED EMBODIMENTS

I turn now to presently-preferred embodiments of the invention.

DRAWINGS

Figure 2:
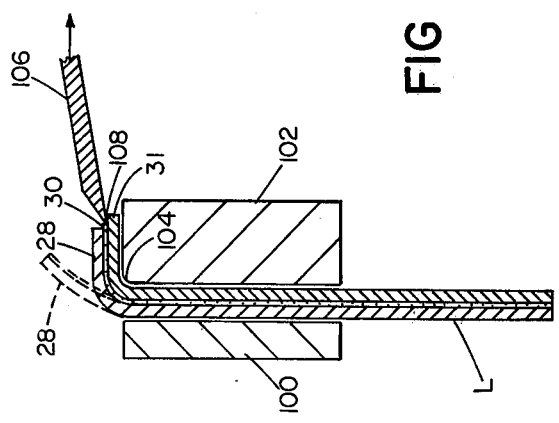
Figure 6:
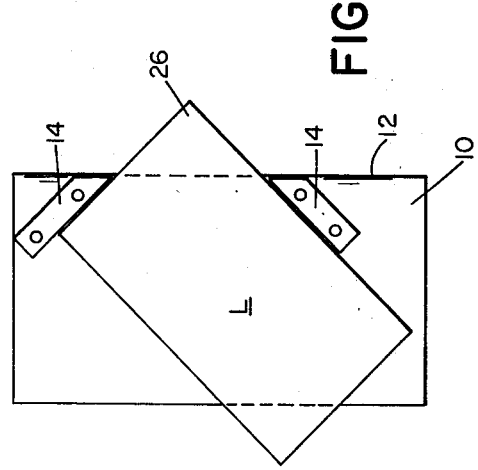

There is shown in:

FIGS. 1(a)–(d) four steps in the use of a first most preferred embodiment;

FIG. 2 a plan view of a portion of said first embodiment;

FIGS. 3(a)–(d) four side-view steps in the use of a second most preferred embodiment;

FIG. 4 a side view of a label-liner element after removal from the step of FIG. 3(d);

FIG. 5 a vertical sectional view, broken away at one end, of a third preferred embodiment of the invention; and FIG. 6 a vertical sectional view of a fourth preferred embodiment of the invention.

DESCRIPTION

The embodiments described in the drawings and their operation are now described.

1. Embodiments

There is shown in FIGS. 1(a)–(d) and 2 a horizontal metal plate 10, 0.040 inches thick with semi-cylindrical (0.020 inches radius) ende 12 and a pair of positioning stops 14. Vertical resilient (spring steel) arm 16, secured as indicated generally at 18 for vertical reciprocal motion, is at its lower end bent to provide a pair of inclined planar surface portions 20 and 22 joined by cylindrical surface portion 24.

In FIGS. 3(a)–(d) is shown a second embodiment, in which an end $E_L$ from a continuous roll of label-liner laminate (0.010 inches thick) enters through slot 40 between stationary metal portions 42 and 44. Secured to portion 44 is Delrin element 45 including depending plate portion 46 (0.035 inches in thickness and 0.203 inches long) and with semi-cylindrical end 48. Secured to horizontal surface 50 of element 45 is block 52 of closed cell Neoprene (material manufactured by Irving B. Moore Corp., Cambridge, Massachusetts under its No. R431-N) downwardly relieved by inclined planar surface 54. Block 52 is 0.325 inches high, 0.260 inches wide at its top, and 0.214 inches wide at its bottom, and surface 54 begins 0.046 inches from the bottom of the block. Beneath the elements just described is a vertically reciprocable deforming and cutting element indicated generally at 56, in the upper portion of which is groove 58, 0.065 inches in width and 0.233 inches deep, defined between metal blade 65 and Delrin element 66 secured to blade 65 (by means not shown). Just downstream of groove 58, in Delrin element 66, are ridge 60 (0.015 inches high, 0.045 inches wide) and flat 62 (0.205 inches wide). Leaf spring 59, held in place by screws 57 (only one shown), biases surface 61 including cutting edge 63 against the inner surface of portion 42, and slides easily on the low-friction surface of Delrin portion 66.

In FIG. 5 is shown a third embodiment, in which a unitary element indicated generally at 80 and formed of sheet metal (with a lower liner portion 82 and adhesive layer 84 to provide for adherence to a workbench if desired) has an initial flat portion 86, followed by a gently curving portion 88, and a sharply curving portion 90. Curved portion 90 should extend all the way to a vertical line through the center of curvature of portion 90 for optimum effect, and yet should not continue to curve beyond that vertical line, to avoid jamming or buckling the laminate. Manufacturing tolerances are thus controlled so that any error in portion 90 is on the short side, and a short (0.015 inches) straight portion 92 is added following portion 90. Extending downwardly (but not shown) from end 87 of portion 86 is another flat portion, followed by a sharply curved portion (curving to the left and then up) of the same radius as portion 90, in turn followed by a straight portion corresponding to portion 92.

In the fourth embodiment of FIG. 6, label L is shown between plates 100 and 102, the latter having a cylindrically rounded edge 104. A finger-like member 106 with a sharp edge 108 is secured (by means not shown) at a slight angle to the horizontal for horizontal oscillatory movement.

2. Operation

In operation, in the first embodiment, lined Label L is placed on plate 10 (label side up), and held down on it, against stops 14, by a finger, with the corner 26 of the label overhanging edge 12 by about 1/16 of an inch. Flexible arm 16 is then moved down. Inclined surface 22 engages the corner 26 of the label, bending it downwardly. As the arm 16 descends further, its tip moves outwardly, all the while resiliently compressing the label portion 28 against adhesive 30 and liner portion 31.

This action continues throughout even the lower half of cylindrical surface 12, so that both layers of the label laminate are bent around a sharp curve for 180° at the laminate tip. Because the label layer 28 is bending about a larger radius than the liner layer 31, a force in shear is mposed causing the lengthwise offset shown in FIGS. 1(b) and (even more, in view of the further bending) 1(c). The laminate end is then released, whereupon the label 28 (usually with better molecular memory for the position from which it has been bent, and in any event with a greater tendency to straighten because of having been bent about a larger radius) springs away from the liner layer 31, adhesion of layer 30 thereto having been weakened by the forces in shear just mentioned.

In the second embodiment (FIGS. 3(a)-(d)), label laminate end $E_L$ is moved as part of a roll through slot 40 and between the upper and lower cutting and deforming units, indicated generally at 64 and 56. When it is positioned to provide the desired length of finished label, cutting and deforming unit 56 is moved upwardly as shown successively in FIGS. 3(b) through (d). First, as shown in FIG. 3(b), the label is cut between edges 63 and 68, which are at an angle of 8° for good "scissoring" or guillotine shearing action. The semi-cylindrical surface 48 then engages the upper surface of the label laminate, against label layer 70. The curved and slippery character of surface 48 counteracts any tendency to draw material in an upstream direction past ridge 60. Sponge element 52, which clamps the downstream end of the label laminate against movement in an upstream direction, beginning even as plate 46 engages the laminate, is compressed further and further, to hold with more and more force, to prevent upstream movement of the laminate into the slot 58. Ridge 60 is of great help to this end. The relief at surface 54 prevents the sponge from being forced into slot 58. A bend in the laminate of 180° is produced around surface 48, and a sharper bend of 90° in the opposite direction is produced around the 90° sharp upstream edge of ridge 60, as shown in FIGS. 3(c) and 3(d). It is important that this final stage the end be able to free itself of control by the semi-cylindrical edge, as by fixing its length to assure clearing (FIG. 3(d)). The product is shown in FIG. 4, the label 70 with its greater memory having gone back toward straight, and the liner 72 retaining at 72a much of the bend given it during the movement around the plate, as well as a sharper bend 72b in the opposite direction given it at ridge 60, the tension resulting from the latter having caused the bond weakened by the shear created in bending to snap apart at the stage shown in FIG. 4, even though the liner memory at 72a urges it toward label 70. The double bend provided by this embodiment makes possible separation of the laminate layers over a longer distance that in the embodiment of FIGS. 1(a)-(d).

In the operation of the third embodiment (FIG. 5), a nameplate unit indicated generally at 94, and including a lower polyester (Mylar) nameplate layer 96, an adhesive layer 98, and a liner layer 99, is introduced, corner first, onto the flat portion 86, and held down against it while being pushed and guided along gently curved (to avoid buckling the nameplate) portion 88 and then around sharply bent portion 90. Layers are compressed together during movement through this sharp portion by the resistance to bending of the nameplate 96. When the laminate moves beyond portion 90, the liner tends to keep its new set, while the nameplate, with a greater memory, separates, as shown generally at 95. The unshown portion extending downwardly from end 87 is useful in the same way for very short nameplates.

In the fourth embodiment (FIG. 6), as the label L is held in place by pressure of plate 100 against plate 102, the overhanging label end is wiped around edge 104 by drawing member 106 to the right. Edge 108 compresses label layer 28 against liner layer 31 as the laminate bends to produce the lengthwise offset of the two layers shown in FIG. 6. The motion of member 106 is advantageously slowed down at the end of its stroke so that edge 108 can momentarily hold the protruding edge of liner layer 31 against plate 102 while label layer 28 springs back, as is shown in dashed lines.

The conception of providing the combination of 90° and 180° bends, using a finger and slot arrangement, was had by Robert H. Parker after my disclosure to him of the embodiments of FIGS. 1(a)-(d) and 6. After learning of Mr. Parker's conception I developed the particular embodiment of FIGS. 3(a)-(d), including sponge 52 and cooperating ridge 60 and flat 62, and the combined cutting and bending actions. Still later, the embodiment of FIG. 5 was invented by E. C. Gehweiler.

I claim:

1. Apparatus for separating layers of a laminate at an end thereof at which said layers are coterminous, comprising means for supporting said laminate to permit bending thereof at said end, and means for applying a force against the outer surface of one said layer and pressing said one layer against the other said layer to simultaneously bend both said layers at said end sufficiently sharply to cause shearing and lengthwise offset therebetween, said outer surface being on the outside of said bend, and for thereafter releasing both said layers to permit them to spring back from said bending said means for supporting comprising a support having a sharply rounded edge, and said means for applying a force comprising a member for wiping around said edge an end of said laminate held on said support.

2. Apparatus according to claim 1 wherein said support comprises a plate and means to locate said laminate on said plate with a corner thereof overhanging said edges.

3. Apparatus according to claim 1 wherein said member comprises means moveable along a straight path passed said edge for wiping said laminate in a 90° bend around said edge.

4. Apparatus according to claim 1 wherein said member is resilient.

5. Apparatus according to claim 4 wherein said member has a portion with a pair of inclined surfaces for wiping said laminate in a 180° bend around said edge, said resilience of said member allowing said inclined surfaces to move past said edge while compressing said laminate.

6. Apparatus according to claim 5 wherein said edge has a cylindrical surface portion.

* * * * *